United States Patent Office 3,332,998
Patented July 25, 1967

3,332,998
2-NITRO-3,4,5,6-TETRACHLORO-N-ALIPHETRIC ANILINES
Alan James Lambie and Geoffrey Tattersall Newbold, Saffron Walden, and Michael Barry Purdew, Cambridge, England, assignors to Fisons Pest Control Limited, Harston, England
No Drawing. Filed Aug. 3, 1964, Ser. No. 387,210
Claims priority, application Great Britain, Aug. 20, 1963, 32,852/64
4 Claims. (Cl. 260—573)

This invention relates to new compounds possessing fungicidal activity and to fungicidal compositions containing them.

It has now been found that certain new aniline derivatives as hereinafter defined possess fungicidal activity, for example against *Erysiphe cichoracearum* (cucumber mildew) and against rice blast.

According to the invention, therefore, there are provided as new compounds aniline derivatives of the formula:

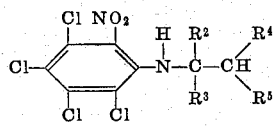

and salts thereof, in which $R^2$ and $R^3$ are the same or are different and each is a hydrogen atom or alkyl, hydroxymethyl, alkoxymethyl or acyloxymethyl group; $R^4$ is a hydrogen atom or a hydroxy, acyloxy, alkoxy, alkyl, hydroxyalkyl, acyloxyalkyl, alkoxyalkyl, hydroxyalkoxy, acyloxyalkoxy or alkoxyalkoxy group; and $R^5$ is a hydrogen atom or an acyloxy, alkoxy, alkyl, hydroxyalkyl, acyloxylalkyl, alkoxyalkyl, hydroxyalkoxy, acyloxyalkoxy or alkoxyalkoxy group. The alkyl and alkoxy groups are suitably of 1–6 carbon atoms.

A preferred embodiment of the invention is for the new compounds:

2-nitro-3,4,5,6-tetrachloro-N-(beta, beta - diethoxy ethyl) aniline,
2-nitro-3,4,5,6 - tetrachloro-N-(beta-hydroxyethyl)aniline and
2 - nitro - 3,4,5,6 - tetrachloro - N - (beta-hydroxy propyl) aniline.

These compounds are active against a variety of fungal infections; for example they are active against *Phytophythora palmivora, Alternaria solani, Botrytis fabae, Fusarium oxysporum, Verticillium albo-atrum, Erysiphe cichoracearum, Uromyces phaseoli, Fomes annosus* and *Piricularia oryzae*.

The new compounds according to the invention may be prepared in any desired manner. It has been found, however, that they are conveniently prepared by reaction of 1,2-dinitro-3,4,5,6-tetrachlorobenzene with an appropriate primary amine.

According to a further feature of the invention, therefore, there is provided a process for the preparation of compounds of the formula:

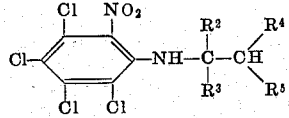

in which $R^2$, $R^3$, $R^4$ and $R^5$ have the meanings defined above which comprises reacting 1,2-dinitro-3,4,5,6-tetrachlorobenzene with an amine of the formula:

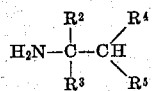

The process according to the invention may be carried out at any convenient temperature, for example at temperatures from below 0° C. to ambient temperature or above, depending upon the nature of the amine. In general with more volatile amines lower temperatures should be employed and with the less volatile amines higher temperatures are preferred.

The reaction may conveniently be carried out in the presence of a solvent, for example in anhydrous alcohol such as anhydrous ethanol. Alternatively, the reaction may be carried out in the absence of a solvent, employing the amine as a solvent for the substituted benzene.

The compounds produced by the process of the invention may be converted into their acyl derivatives where the acyl group is attached to oxygen by acylation with a suitable acylating agent, for example, acetylation with acetic anhydride.

In some cases the compounds obtained by the process of the invention may also be converted into their acid salts by reaction with a suitable acid, such as for example hydrochloric acid, hydriodic acid or sulphuric acid.

The invention also includes within its scope fungicidal compositions containing the new compounds of the invention.

According to a further embodiment of the invention, therefore, there is provided a fungicidal composition comprising a compound of the formula:

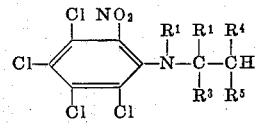

and salts thereof, in which $R^1$ is a hydrogen atom or an acyl group; $R^2$ and $R^3$ are the same or are different and each is a hydrogen atom or alkyl, hydroxymethyl, alkoxymethyl or acyloxymethyl group; $R^4$ is a hydrogen atom or a hydroxy, acyloxy, alkoxy, alkyl, hydroxyalkyl, acyloxyalkyl, alkoxyalkyl, hydroxyalkoxy, acyloxyalkoxy or alkoxyalkoxy group; and $R^5$ is a hydrogen atom or an acyloxy, alkoxy, alkyl, hydroxyalkyl, acyloxyalkyl, alkoxyalkyl, hydroxyalkoxy, acyloxyalkoxy or alkoxyalkoxy group; together with a carrier or diluent or a wetting agent. Preferred compositions according to the invention are those in which the active compounds are the preferred compounds referred to above.

The carrier or diluent employed in the fungicidal compositions according to the invention may be either solid or liquid.

Thus, for example, the compositions may take the form of solutions or suspensions in water depending upon the water-solubility of the particular compound in question. In the case in which the composition comprises an aqueous suspension of the active compound, such suspension may also contain one or more wetting agents.

In another form of the composition of the invention the active aniline derivatives may be mixed with a wetting agent, with or without the incorporation of other powdered or divided solid material, to produce a wettable product which may be used as such or as a suspension or dispersion in water.

The aniline derivatives may also be incorporated for example with solid inert media comprising powdered or divided solid materials, for example clays, sands, talc, mica, fertilizers and the like, such products comprising either dust or larger particle size materials.

Another form of fungicidal composition according to the invention comprises the aniline derivative mixed with solid inert media, as referred to above, together with a wetting agent to form a wettable powder which may be used as such or as a suspension or dispersion in water.

Wetting agents which may be used include anionic agents such as for example soaps, fatty sulphate esters such as dodecyl sodium sulphate, fatty aromatic sulphonates such as alkylbenzene sulphonates or butyl naphthalene sulphonate, more complex fatty sulphonates such as the amide condensation product of oleic acid and N-methyl taurine or the sodium sulphonate of dioctyl succinate.

Other wetting agents which may be used are non-ionic agents such as for example condensation products of fatty acids, fatty alcohols or fatty substituted phenols with ethylene oxide, or fatty esters and ethers of sugar or polyhydric alcohols, or the products obtained from the latter by condensation with ethylene oxide, or the products known as block copolymers of ethylene oxide and propylene oxide. Further wetting agents which may be used are cationic agents such as for example cetyl trimethylammonium bromide and the like.

If desired the fungicidal compositions according to the invention may also contain, in addition to the aniline derivatives, other agricultural chemicals such as herbicides, fungicides, pesticides, plant growth regulants and the like.

The invention also includes within its scope a process of treating plants, areas or materials which comprises treating the plants, areas or materials with a fungicidal composition as identified above.

In order that the invention may be well understood the following examples are given by way of illustration only. In the examples all parts and percentages are by weight unless otherwise stated.

Example 1

15.3 parts of o-dinitro-tetrachloro-benzene suspended in 25 parts of ethanol were mixed with 50 parts of anhydrous ethylamine in 25 parts of ethanol at below 0° C. and the reactants left together in a sealed vessel for 24 hours. The reaction was slightly exothermic, and the reaction mixture soon became a bright red. Evaporation of solvent in vacuo yielded an orange solid. This was extracted with ether, water washed, dried and evaporated down to vacuo to give 14.1 parts (92.8% yield) of an orange solid melting point 66–70° C. Recrystallisation from aqueous ethanol gave 2-nitro-3,4,5,6-tetrachloro-N-ethyl aniline, melting point 75° to 77.5° C.

*Analysis.*—Found: C, 31.40%; H, 2.00%; Cl, 46.40%; N, 9.25%. $C_8H_6Cl_4N_2O_2$ requires: C, 31.60%; H, 1.99%; Cl, 46.65%; N, 9.22%.

Example 2

30.6 parts of o-dinitro-tetrachlorobenzene suspended in 100 parts of ethanol were mixed with 50 parts of n-butylamine in 50 parts of ethanol at below 0° C. and left in a sealed vessel for 24 hours. The product was isolated as in Example 1 to yield 30 parts (90.4% yield) of an orange solid. Recrystallisation from methanol gave 2-nitro-3,4,5,6-tetrachloro-N-n-butyl aniline, melting point 46–47° C.

*Analysis.*—Found: C, 36.15%; H, 3.20%; Cl, 42.65%; N, 8.50%. $C_{10}H_{10}Cl_4N_2O_2$ requires: C, 36.17%; H, 3.04%; Cl, 42.73%; N, 8.44%.

Example 3

30.6 parts of tetrachloro-o-dinitrobenzene were suspended in 100 parts of ethanol and 15 parts of ethanolamine were added slowly with shaking at room temperature. An exothermic reaction caused the temperature to rise to 40° C., and the reaction mixture became bright orange. The mixture was warmed on a steam bath until complete solution was obtained and then allowed to stand in a sealed vessel for 21 hours. Addition of an equal volume of water caused the precipitation of an orange oil, which solidified on cooling. The yield of crude product, melting point 85–90° C., 31.3 parts (97.8% yield). Recrystallisation from aqueous ethanol gave a bright yellow crystalline product which was 2-nitro-3,4,5,6-tetrachloro-N-(beta-hydroxyethyl)aniline, melting point 101–103° C.

*Analysis.*—Found: C, 30.00%; H, 1.95%; Cl, 44.55%. $C_8H_6Cl_4N_2O_3$ requires: C, 30.03%; H, 1.89%; Cl, 44.32%.

Example 4

40 parts of tetrachloro-o-dinitrobenzene were suspended in 150 parts of ethyl alcohol and 27 parts of 3-methoxypropylamine were added with shaking. Only a slight increase in temperature was observed, but a bright orange colouration was soon noticed. The reaction mixture was heated on a steam bath until complete solution was obtained and then allowed to stand for 22 hours in a sealed vessel. The bright yellow crystalline solid which formed was filtered off and dried, melting point about 58° C., 35 parts (76.9% yield).

Recrystallisation from ethanol gave 2-nitro-3,4,5,6-tetrachloro-N-(gamma-methoxy propyl)aniline, melting point 59–60° C.

*Analysis.*—Found: C, 34.30%; H, 3.00%; Cl, 40.95%. $C_{10}H_{10}Cl_4N_2O_3$ requires: C, 34.51%; H, 2.90%; Cl, 40.76%.

Example 5

15.3 parts of tetrachloro-o-dinitrobenzene and 13.4 parts of amino acetal were mixed at room temperature, warmed slightly until complete solution was obtained, allowed to stand in a sealed vessel for 24 hours, and the reaction mixture concentrated in vacuo. The residue was extracted with ether, water washed, dried and evaporated in vacuo. The crude product after recrystallisation from aqueous methanol gave a yellow solid which was 2-nitro-3,4,5,6 - tetrachloro-N-(beta, beta-diethoxy ethyl)aniline, melting point 35–36° C., yield 14.2 parts (72%).

Example 6

The process of Example 3 was repeated replacing the ethanolamine by the appropriate amine, corresponding to the product indicated below. The products were recrystalised and the following melting points found.

| Compound: | Melting point ° C. |
|---|---|
| 2 - nitro - 3,4,5,6-tetrachloro - N - (alpha-hydroxypropyl) aniline | 86–88 |
| 2 - nitro - 3,4,5,6 - tetrachloro - N - (beta-hydroxy propyl) aniline | 133–135 |
| 2 - nitro - 3,4,5,6 - tetrachloro - N-(alpha, alpha - di(hydroxymethyl)ethyl) aniline | 138–140 |
| 2 - nitro - 3,4,5,6 - tetrachloro - N - (beta, gamma-dihydroxy propyl) aniline | 87–89 |
| 2 - nitro - 3,4,5,6 - tetrachloro - N - (beta-ethoxy ethyl) aniline | 56–57 |
| 2 - nitro - 3,4,5,6 - tetrachloro - N - (beta-acetoxy ethyl) aniline | 99–100 |
| 2 - nitro - 3,4,5,6-tetrachloro - N - (beta-benzoyloxy ethyl) aniline | 116–117 |
| 2 - nitro - 3,4,5,6 - tetrachloro - N - (octyl) aniline | 48–50 |

Example 7

The following compounds:

2-nitro-3,4,5,6-tetrachloro-N-(beta, beta-diethoxy ethyl) aniline,

2 - nitro-3,4,5,6-tetrachloro-N-(beta-hydroxyethyl) aniline and

2 - nitro - 3,4,5,6 - tetrachloro - N-(beta-hydroxy propyl) aniline were incorporated into the nutrient medium known as potato sucrose agar, in a molten state, at concentrations of 100 and 10 parts per million (p.p.m.), in 9 cm. Petri dishes under sterile conditions. After 24 hours each plate was inoculated with a 6 mm. disc of agar containing actively growing Piricularia oryzae (rice blast). The dishes were then cultured in the dark at controlled temperatures of 28–30° C. The fungal growths were examined 4 and 9 days after inoculation and a comparison made with control plates containing only the nutrient medium without added chemicals. It was found that at a concentration of 100 p.p.m. all the compounds completely inhibited growth of the fungus; at 10 p.p.m. the compounds gave 75% inhibition of the growth of the fungus.

Example 8

2-nitro-3,4,5,6-tetrachloro-N-(beta, beta-diethoxyethyl) aniline was incorporated into the nutrient medium known as potato dextrose agar in the molten state at concentrations of 1000, 300 and 100 parts per million (p.p.m.) by weight per volume of medium. The liquids were poured into petri dishes under sterile conditions and the cooled culture plates inoculated with mycelial plugs of the following plant parasitic fungi: *Phytophthora palmivora* (black pod of cocoa), *Alternaria solani* (early blight of tomatoes), *Botrytis fabae* (chocolate spot of beans), *Fusarium oxysporum* var cubense (Panama disease), *Verticillium albo-atrum* (stem wilt).

The plates were cultured at 20° C. for seven days and then the concentration which gave complete inhibition of growth noted for the various species: These were 1000 p.p.m. for *Verticillium albo-atrum*, 300 p.p.m. for *Fusarium oxysporum* and *Phytophthora palmivora* and 100 p.p.m. for *Alternaria solani* and *Botrytis fabae*.

Example 9

An acetone solution containing 10% to 2-nitro-3,4,5,6-tetrachloro-N-(beta, beta-diethoxyethyl)aniline and 2.5% of the nonylphenol/ethylene oxide condensation product known as Lissapol NX was diluted with water to give an aqueous dispersion of 0.2% active ingredient plus 0.05% wetting agent. This solution was sprayed on cucumber plants which when dry were dusted with conidia of *Erysiphe cichoracearum*, the cucumber mildew. The plants were then held in an incubation chamber at 26° C. and 90% humidity for ten days before the degree of infection was assessed. The treated plants showed only 15% of the leaves infected by comparison with 100% in the unsprayed controls.

Example 10

A 0.2% solution of 2-nitro-3,4,5,6-tetrachloro-N-(beta, beta-diethoxyethyl)aniline was made up as in Example 9 and applied to the primary leaves of Pinto beans. When the leaves were dry and 10% spore suspension in talc of the bean rust *Uromyces phaseoli* was applied to them and the plants placed in the dark for 24 hours at a temperature of 16° C. and in humidity of 95%. After further incubation for ten days in a controlled environment room (temperature: 18° C.; R.H. 80% and 14 hours illumination per day), the plants were assessed for disease symptoms when it was found that the treatment had given 75% protection by comparison with untreated control.

Example 11

2-nitro-3,4,5,6-tetrachloro-N-(beta - hydroxyethyl)aniline was incorporated into the nutrient medium known as potato dextrose agar in the molten state at concentrations of 1000, 300 and 100 parts per million by weight per volume of medium. The liquids were poured into petri dishes under sterile conditions and the cooled culture plates inoculated with mycelial plugs of the following plant parasitic fungi: *Phytophthora palmivora, Alternaria solani, Botrytis fabae, Fusarium oxysporum var cubense, Verticillium albo-atrum, Fomes annosus.*

After culturing for seven days at 20° C. the plates were examined to determine the minimum concentration giving complete inhibition of growth. This was found to be 100 parts per million for all species.

Example 12

An acetone solution containing 10% of 2-nitro-3,4,5,6-tetrachloro-N-(beta-hydroxyethyl)-aniline and 2.5% of the nonylphenol/ethylene oxide condensation product known as Lissapol NX was diluted with water to give an aqueous dispersion of 0.2% active ingredient plus 0.05% wetting agent. This solution was sprayed on cucumbers which when dry were dusted with conidia of *Erysiphe cichoracearum*, the cucumber mildew. After ten days incubation at 26° C. and 90% humidity the degree of infection was assessed and it was found that the treatment had conferred complete protection by comparison with 100% infection of the untreated controls.

Example 13

The process of Example 3 was repeated replacing the ethanolamine by the appropriate amine to give the following compounds:

2-nitro-3,4,5,6-tetrachloro-N-(beta-ethoxyethoxy ethyl) aniline
2-nitro-3,4,5,6-tetrachloro-N-(beta-hydroxyethoxy ethyl) aniline
2-nitro-3,4,5,6-tetrachloro-N-(isopropyl) aniline
2-nitro-3,4,5,6-tetrachloro-N-(alpha, alpha-di (methoxymethyl) ethyl) aniline
2-nitro-3,4,5,6-tetrachloro-N-(beta-propionyloxyethoxy ethyl) aniline
2-nitro-3,4,5,6-tetrachloro-N-(alpha, alpha-di (acetoxymethyl) ethyl) aniline

We claim:

1. A member selected from the group consisting of compounds of the formula:

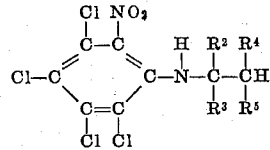

and salts thereof, in which $R^2$ and $R^3$ are selected from the group consisting of hydrogen, alkyl, hydroxymethyl, alkoxymethyl and acetoxymethyl, $R^4$ is selected from the group consisting of hydroxy, acetoxy, benzoyloxy, alkoxy, alkyl hydroxyalkyl, acetoxyalkyl, alkoxyalkyl, hydroxyalkyl, hydrogen and alkoxyalkoxy and $R^5$ is selected from the group consisting of acetoxy, benzoyloxy, alkoxy, alkyl, hydroxyalkyl, acetoxyalkyl, alkoxyalkyl, hydroxyalkoxy, hydrogen, acyloxyalkoxy and alkanoyloxyalkoxy, alkoxy being throughout alkoxy with 1 to 6 carbon atoms and alkyl being throughout alkyl with 1 to 6 carbon atoms.

2. 2-nitro-3,4,5,6-tetrachloro - N - (beta, beta-diethoxy ethyl) aniline.

3. 2-nitro-3,4,5,6-tetrachloro-N-(beta-hydroxy ethyl) aniline.

4. 2-nitro-3,4,5,6-tetrachloro-N-(beta-hydroxy propyl) aniline.

References Cited

UNITED STATES PATENTS

| | | | |
|---|---|---|---|
| 1,980,536 | 11/1934 | Lange | 260—573 |
| 2,552,354 | 5/1951 | Glahn et al. | |
| 2,927,053 | 3/1960 | Eden | 167—30 |
| 2,953,490 | 9/1960 | Deebel | 167—30 |
| 3,194,838 | 6/1965 | Ross | 260—573 |

OTHER REFERENCES

Qvist et al.: "Chemical Abstracts," vol. 50, page 11347 (1956).

Qvist et al.: "Chemical Abstracts," vol. 54, page 6593 (1960).

CHARLES B. PARKER, *Primary Examiner.*

ROBERT V. HINES, *Assistant Examiner.*